Sept. 29, 1964
T. R. HARPLEY
3,151,289
SWITCHING CONTROL FOR MAINTAINING THE CURRENT
WITHIN PREDETERMINED LEVELS
Filed May 2, 1962
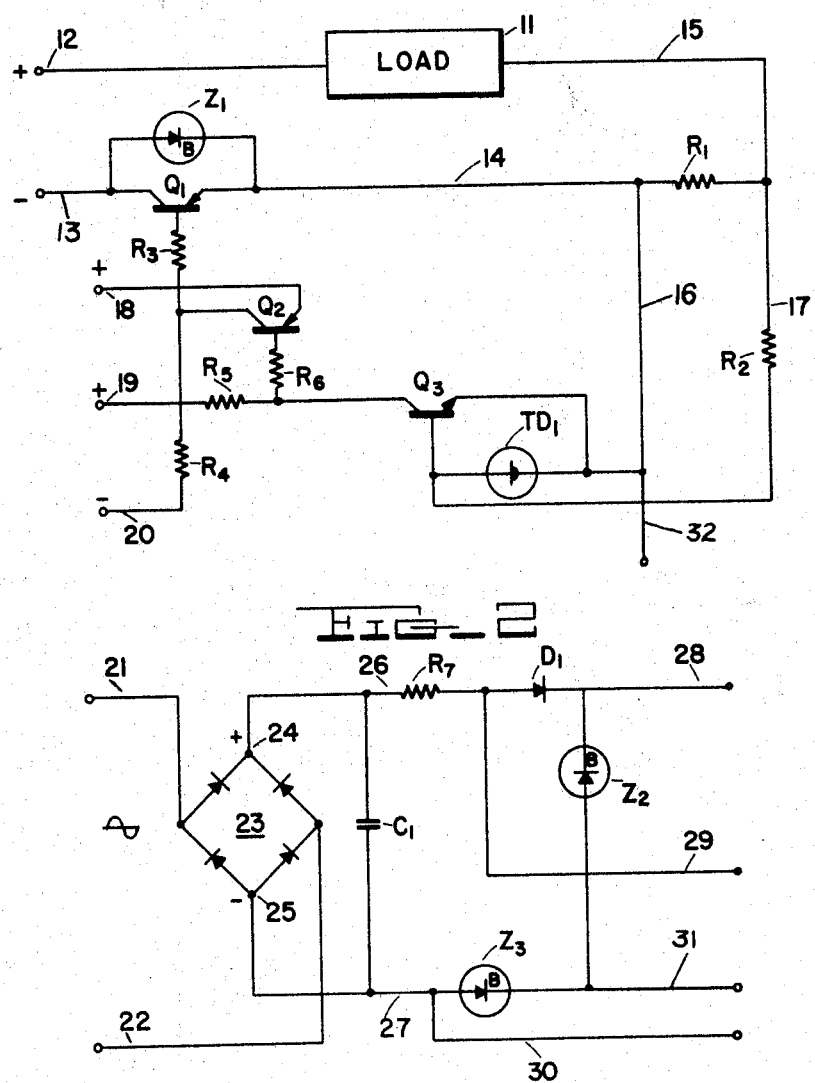
INVENTOR:
THEODORE R. HARPLEY,
BY *Henry J. Marciniak*
ATTORNEY

United States Patent Office 3,151,289
Patented Sept. 29, 1964

3,151,289
SWITCHING CONTROL FOR MAINTAINING THE CURRENT WITHIN PREDETERMINED LEVELS
Theodore R. Harpley, Danville, Ill., assignor to General Electric Company, a corporation of New York
Filed May 2, 1962, Ser. No. 191,881
7 Claims. (Cl. 323—22)

The invention relates to a switching control circuit and more particularly to an improved switching control circuit wherein the switching action is controlled in response to a feedback signal.

There are many applications where it is desirable to control electrical energy supplied to a load. In a commonly used phase controlled switching circuit the electrical energy supplied to a load is controlled by switching on a semiconductor device, such as a silicon controlled rectifier, at a predetermined point in each half cycle to control the electrical energy supplied. In such a phase controlled circuit, the semiconductor device is switched on and off in each half cycle. Although the point in the half cycle at which the semiconductor device is switched on or off can be controlled by means of a manually adjustable potentiometer, this type of switching control circuit is not readily adaptable to control by means of a feedback signal. Frequently, it is desirable, if not necessary, that the circuit used to control the energy supplied to a load from an alternating or a direct current source be adaptable to regulation by a suitable feedback means.

It is, therefore, a general object of the present invention to provide an improved switching control circuit that is readily controlled by a feedback signal.

Another object of the invention is to provide an improved switching control circuit for controlling the electrical energy supplied to a load by connecting and disconnecting the power source from the load.

A more specific object of the invention is to provide an improved switching control circuit wherein the switching means is in a closed position.

It is a further object of the present invention to provide an improved switching control circuit wherein the switching means is switched from a high impedance to a low impedance state in response to a feedback signal.

Further objects and advantages will become apparent as the following description proceeds and the subject matter which I regard as my invention is pointed out with particularity in the claims annexed to and forming a part of this specification.

In carrying out the object of my invention in one form thereof, I provide an improved switching control circuit wherein a switching means is selectively driven to a closed and to an open position. The switching means may be in either a normally closed or a normally opened position. Preferably, the switching means is a transistor having three adajacent zones of P and N type of semiconducting material and is driven by a circuit which includes at least one control transistor and a current level detecting means connected across the emitter and base of the control transistor. The current level detecting means may be a solid state device such as a tunnel diode and is switched from a high impedance to a low impedance state in response to a feedback signal to activate the control transistor. The feedback means is adaptable to sense one or more quantities such as load current, load voltage, supply voltage temperature and others.

In a further aspect of my invention, I provide a first and a second control transistor and a tunnel diode in a bistable flip flop arrangement to drive a normally closed transistor switch. The first control transistor is coupled with the base of the transistor switch and causes the base drive to be removed therefrom when the control transistor is switched on. The emitter and base electrodes of the second control transistor are connected across the tunnel diode. The second control transistor is switched into conduction when the tunnel diode is in a high voltage state. When the second control transistor conducts, drive is applied to the first control transistor, and when both the first and second control transistors are switched on, the transistor switch is switched off. Thus, the transistor switch is controlled in response to changes in the feedback signal applied to the tunnel diode. In the switching control circuit of the invention, variations in a signal of relatively small magnitude provide a control of the switching action of a transistor switch capable of handling currents of relatively large magnitude.

For a better and more complete understanding of the invention, reference should be made to the following description taken in conjunction with the accompanying drawing wherein:

FIGURE 1 is a schematic circuit diagram of a preferred embodiment of the invention; and FIGURE 2 is a schematic circuit diagram of the driver power supply used in the embodiment illustrated in FIGURE 1.

Referring now in more detail to FIGURES 1 and 2 of the drawing, the improved switching control circuit of the invention is shown connected in circuit with a load 11 having some inductive component. A pair of input terminal leads 12, 13 are provided for connection to a suitable D.C. power source. The current supplied to the load 11, which may be, for example, an armature of a D.C. dynamoelectric machine, is controlled by the switching action of a PNP transistor switch $Q_1$. The transistor switch $Q_1$ is connected in circuit with the load 11 and with an input terminal lead 13 adapted for connection to the negative side of the power supply. A Zener diode $Z_1$ is connected in shunt across the emitter and collector electrodes of the transistor switch $Q_1$ to protect the transistor switch $Q_1$ from excessive transient voltages.

A shunt resistor $R_1$ is connected in series circuit relation with the load by electrical leads 14 and 15. The shunt resistor $R_1$ in conjunction with a feedback resistor $R_2$ allows a feedback signal of a relatively small magnitude to flow in a feedback loop which includes feedback leads 16, 17, the tunnel diode $TD_1$ and resistors $R_1$ and $R_2$.

The tunnel diode $TD_1$ used in the illustrative embodiment of the invention is a two terminal semiconductor device employing a single PN junction. The P-layer is referred to herein as the anode and is shown schematically by the vertical line while the N-layer is referred to herein as the cathode and is shown schematically as an arcuate portion joined to the anode. When a forward voltage less than the peak voltage is applied, the tunnel diode exhibits a low resistance and may be considered in its low impedance state. For a range of intermediate values of the forward voltage, the tunnel diode is characterized by a negative conductance. Above its valley point value, the tunnel diode has a characteristic similar to the forward characteristic of a conventional diode.

Tunnel diode $TD_1$, a PNP control transistor $Q_2$ and a NPN control transistor $Q_3$ comprise a bistable flip flop circuit to control the power transistor switch $Q_1$. Control transistor $Q_3$ is switched in and out of conduction as the tunnel diode $TD_1$ is switched from its low voltage to high voltage state. Resistors $R_3$, $R_4$, $R_5$ and $R_6$ control the bias conditions of transistors switch $Q_1$ and control transistor $Q_2$. The base drive supply for transistors $Q_1$ and $Q_2$ is obtained by connecting terminal leads 18, 19, 20 and 32 to a suitable bias supply.

Referring now to FIGURE 2, I have illustrated therein an exemplification of a suitable base drive power supply which may be used in conjunction with the switching control circuit shown in FIGURE 1. The base drive power supply includes a pair of input leads 21, 22 which are adapted for connection to an alternating current supply. The input leads 21, 22 are connected to a fullwave bridge rectifier 23 having a filter capacitor $C_1$ connected across its output terminals 24, 25 to provide a filtered fullwave rectified output at leads 26, 27.

A resistor $R_7$ is connected with electrical leads 26 and 28 and limits the current output of the driver power supply. To regulate the voltage at output leads 28, 29 and 30, a pair of Zener diodes $Z_2$, $Z_3$ and a diode $D_1$ are provided. Zener diode $Z_2$ limits the positive voltage at output terminal lead 28 to its reverse breakdown voltage which in the exemplificaiton of the invention was 6.8 volts. At terminal lead 29 a positive bias equal in magnitude to the sum of the forward voltage drop of diode $D_1$ and the reverse breakdown voltage of Zener diode $Z_2$ is provided. Zener diode $Z_3$ connected in circuit with the negative terminal 25 of the fullwave bridge rectifier 23 regulates the negative voltage and maintains the voltage at output terminal lead 30 at its reverse breakdown voltage which was 6.8 volts.

It will be seen that the output terminals 28, 29, 30 and 31 are adapted for connection to the leads 18, 19, 20 and 32 of the driver circuit, respectively. When the driver power supply is connected in circuit with the switching control circuit, a negative base drive is applied to the base electrode of the transistor switch $Q_1$. If there is no current flow through the shunt resistor $R_1$ or if the feedback signal is below a first predetermined level, the tunnel diode $TD_1$ is in a low voltage state. Consequently, control transistors $Q_2$ and $Q_3$ are in the open position, and the base drive provided at lead 20 will maintain the transistor switch $Q_1$ in a normally closed position until the tunnel diode $TD_1$ is switched to its high voltage state.

Operation of the switching control circuit is initiated by connecting the input terminal leads 12, 13 in circuit with a suitable D.C. source. Since the transistor switch $Q_1$ is normally in a closed position, power will be supplied to the load 11 and current will flow through shunt resistor $R_1$. As this current through the shunt resistor $R_1$ increases, the voltage drop across the shunt resistor $R_1$ increases proportionally with the load current. When the current through tunnel diode $TD_1$ reaches its peak point value, the tunnel diode $TD_1$ is switched into a high voltage state. Thus, the base electrode of the control transistor $Q_3$ becomes more positive with respect to the emitter and transistor $Q_3$ is switched on. It will be noted that the emitter of transistor $Q_3$ is connected to lead 16 connected to the left end of the shunt resistor $R_1$ which is negative with respect to the right end as seen in FIGURE 1. When the control transistor $Q_3$ is triggered into conduction, it connects the base electrode of control transistor $Q_2$ in circuit with lead 16 and consequently, the base electrode of transistor $Q_2$ is now negative with respect to the emitter and it conducts. When control transistor $Q_2$ conducts, base drive for transistor switch $Q_1$ is removed. The transistor switch $Q_1$ remains turned off so long as the tunnel diode $TD_1$ is in a high voltage state. Tunnel diode $TD_1$ will revert to a low voltage state when the voltage drop across the shunt resistor $R_1$ reaches a point where the voltage across the tunnel diode $TD_1$ reaches its valley point value, at which time it is reset to a low voltage state.

When tunnel diode $TD_1$ reverts to its low impedance state, the base electrode of transistor $Q_3$ is no longer positive with respect to the emitter and transistor $Q_3$ returns to a nonconducting state and turns off control transistor $Q_2$. With control transistor $Q_2$ switched off, the positive bias terminal 18 is cut off from the base electrode of the transistor switch $Q_1$. The base electrode of transistor switch $Q_1$ is now positive with respect to its emitter electrode and transistor switch $Q_1$ is switched on. This switching cycle will continue so long as voltage across the tunnel diode $TD_1$ is sufficient to actuate the tunnel diode.

From the foregoing description of the operation of the switching control circuit, it will be apparent that the switching circuit will maintain the current supplied to the load within predetermined levels by alternately connecting and disconnecting the power supply. Although I have shown a feedback arrangement wherein the feedback signal used to control the switching action is proportional to the load current, it will be apparent that the switching circuit may be readily actuated by a feedback signal from such devices as photoelectric cells, thermistors and other sensing elements that provide a current that is indicative of other parameters that may provide a suitable basis for control. Further, it will be appreciated that where the transistor switch is to be operated in a normally open position only one of the control transistors may be employed in the bistable flip flop arrangement. Although the transistor switch $Q_1$ in the illustrated embodiment of the invention functions as a unidirectional switch, this switching control circuit can be converted to bidirectional type of operation by connecting diodes across the transistor switch and resistor $R_1$ in a bridge arrangement so that each alternation of the alternating current supply appears as a unidirectional current through the transistor switch $Q_1$.

While the present invention has been described by reference to a preferred embodiment thereof, it will be understood that modifications may be made by those skilled in the art without actually departing from the invention. It is, therefore, intended in the appended claims to cover all such equivalent variations that come within the true spirit and scope of the invention.

What I claim as new and desire to secure by Letters Patent of the United States is as follows:

1. A switching control circuit for maintaining the current supplied to a load within predetermined levels by alternately connecting and disconnecting a power source from the load, said switching control circuit comprising a transistor switch having an emitter electrode, a base electrode and a collector electrode, said emitter and collector electrodes being connected in circuit with the load, a bistable flip flop circuit including at least one control transistor switchable from a high to a low impedance state, a tunnel diode having an anode and a cathode, said tunnel diode being switchable to a high voltage and to a low voltage state, a bias supply means to drive said transistors, circuit means coupling the control transistor of said bistable flip flop circuit with the base electrode of the transistor switch and in circuit with said bias supply to apply base drive to said transistor switch when said control transistor is in one of said states and to remove the base drive from said transistor switch when the control transistor is switched to the other of said states, said circuit means including electrical leads connecting the cathode of said tunnel diode in circuit with the emitter of said control transistor and connecting the anode of said tunnel diode with the base electrode of said control transistor, and a feedback means supplying a feedback signal to said tunnel diode, said feedback signal at one predetermined level switching said tunnel diode to a low voltage state and at another predetermined level switching said tunnel diode to a high voltage state to cause said control transistor to be switched on and off, and said feedback signal provided by said feedback means controlling the switching action of said transistor switch.

2. A switching control circuit for maintaining the current supplied to a load within predetermined levels by alternately connecting and disconnecting a power source from the load, said switching control circuit comprising a transistor switch having an emitter electrode, a base electrode and a collector electrode, a bistable flip flop circuit including at least one control transistor capable of being switched to a high impedance state and to a low impedance state, a tunnel diode, said tunnel diode having an anode and a cathode, a bias supply means to drive said transistors, circuit means coupling said control transistor of said bistable flip flop circuit with the base electrode of said transistor switch and in circuit with said bias supply to apply base drive to said transistor switch when said control transistor is switched to one of said states and to remove base drive from said transistor switch when the control transistor is switched to the other of said states, and a feedback means supplying a feedback signal to said tunnel diode, said circuit means including electrical means connecting the cathode of said tunnel diode in circuit with the emitter of said control transistor and connecting the anode of said tunnel diode with the base electrode of said control transistor, said tunnel diode being activated to a low voltage state and to a high voltage state in response to the magnitude of said feedback signal and thereby causing said control transistor to be switched on and off, and said feedback signal provided by said feedback means controlling the switching action of said transistor switch.

3. A switching control circuit for maintaining the current supplied to a load within predetermined levels by alternately connecting and disconnecting a power source from the load, said switching control circuit comprising a transistor switch having an emitter electrode, a base electrode and a collector electrode, said emitter electrode being connected in circuit with the load, a bistable flip flop circuit including at least one control transistor switchable to a high impedance state and to a low impedance state, a tunnel diode having an anode and a cathode, said tunnel diode being activated to a high voltage and to a low voltage state, a Zener diode connected in shunt across said transistor switch, a bias supply means to drive said transistors, circuit means including input leads for connection in circuit with the load and coupling said control transistor of said bistable flip fiop circuit with the base electrode of the transistor switch and in circuit with said bias supply to apply base drive to said transistor switch when said control transistor is in one of said states and to remove the base drive from the transistor switch when the control transistor is switched to the other of said states, said circuit means including an electrical lead connecting the cathode of the said tunnel diode in circuit with the emitter of said control transistor and connecting the anode of said tunnel diode with the base electrode of said control transistor, and a feedback means supplying a feedback signal to said tunnel diode proportional to the load current, said feedback signal repetitively activating said tunnel diode from a low voltage state to a high voltage state to cause the transistor switch to be switched on and off in response to the magnitude of the feedback signal, and said feedback signal provided by said feedback means thereby controlling the switching action of said transistor switch.

4. A switching control circuit for maintaining the current supplied to a load within predetermined levels by alternately connecting and disconnecting a power source from the load, said switching control circuit comprising a first and second input terminal lead for coupling said switching circuit to the power source, a transistor switch having an emitter electrode, a base electrode and a collector electrode, connections for joining said collector and emitter electrodes in circuit with the load and one of said input terminal leads, said transistor switch when activated to a high impedance state causing the power source to be disconnected from the load, a first control transistor having an emitter electrode, a base electrode and a collector electrode, a bias supply means connected in circuit with the base electrodes of said transistor switch and said first control transistor, circuit means connecting the collector and emitter electrodes of said first control transistor in circuit with the base electrode of said transistor switch to remove the base drive from said transistor switch when said first control transistor is switched on, a second control transistor having an emitter electrode, a base electrode and a collector electrode, a current level detecting means connected across the emitter and base of said second control transistor, said current level detecting means switching from a high impedance state to a low impedance state in response to the current level detected by said means, means coupling the base electrode of said first control transistor with said second control transistor to cause the base drive to be applied to the base electrode of said first control transistor when said second control transistor is switched on, and a feedback means coupled with said current level detecting means to provide a feedback signal to said current level detecting means, said current level detecting means switching said second control transistor on and off in response to the magnitude of the feedback signal, and said feedback signal controlling the switching action of said transistor switch.

5. A switching control circuit for maintaining the current supplied to a load within predetermined levels by alternately connecting and disconnecting a power source from the load, said switching control circuit comprising a first and a second input terminal lead for coupling said switching circuit with the power source, a PNP transistor switch having an emitter electrode, a base electrode and a collector electrode, connections for joining said collector and emitter electrodes in circuit with the load and one of said input terminal leads, said transistor switch when activated to a high impedance state causing the power source to be disconnected from the load, a first control transistor having an emitter electrode, a base electrode and a collector electrode, a bias supply means connected in circuit with the base electrode of said transistor switch and said first control transistor, circuit means connecting said collector electrode of said first control transistor in circuit with the base electrode of said transistor switch to remove base drive from said transistor switch when said first control transistor is switched on, a second control transistor having an emitter electrode, a base electrode and a collector electrode, a current level sensing means connected across the emitter and base electrode of said second control transistor, a second circuit means coupling the base electrode of said first control transistor with said second control transistor to cause the base drive to be applied to the base electrode of said first control transistor when said second control transistor is switched on, and a feedback means coupled with said current level sensing means to provide a feedback signal to said current level sensing means, said current level sensing means switching said second control transistor to a low impedance state and to a high impedance state in response to the magnitude of the feedback signal, and said feedback signal thereby controlling the switching action of said transistor switch to alternately connect and disconnect the power source from the load.

6. A switching control circuit for maintaining the current supplied to a load by alternately connecting and disconnecting a power source from a load, said control circuit comprising a transistor switch having a base electrode, a collector electrode, and an emitter electrode, a bias supply means providing a positive and a negative bias, a first control transistor having a base electrode, an emitter electrode and collector electrode, a second control transistor having a base electrode, an emitter electrode and a collector electrode, a tunnel diode connected across the base electrode and emitter electrode of said second control transistor, said tunnel diode when switched to a high voltage state causing said second control transistor to conduct and said tunnel diode when reset to its low voltage state causing said second control transistor to be switched off, circuit means for applying the negative bias of the bias supply means to the base electrode of said transistor switch and connecting the collector electrode of said first control transistor in circuit with the base electrode of said transistor switch, said circuit means connecting the emitter of said first control transistor in circuit with the bias supply means so that when said first control transistor is switched on the base electrode of said transistor switch is positive with respect to its emitter electrode, means for coupling the collector electrode of said second control transistor in circuit with the base electrode of said first control transistor so that when said second control transistor conducts the base electrode of said first control transistor is negative with respect to its emitter and is switched on, and feedback means supplying a feedback signal to said tunnel diode to repetitively activate said tunnel diode from a high voltage state to a low voltage state to control the switching action of said transistor switch.

7. A switching control circuit for regulating the current supplied to a load by alternately connecting and disconnecting the power source from the load, said control circuit comprising a PNP transistor switch having a base electrode, a collector electrode and an emitter electrode, a first control transistor having a base electrode, a collector electrode and an emitter electrode, a second control transistor having a base electrode, a collector electrode and an emitter electrode, a tunnel diode connected across the base electrode and emitter electrode of said second control transistor, said tunnel diode when switched to a high voltage state causing said second control transistor to conduct and said tunnel diode when reset to its low voltage state causing said second control transistor to be switched off, a bias supply means for providing a positive and a negative bias circuit means including leads for applying the negative bias of said bias supply means to the base electrode of said transistor switch and leads connecting the collector electrode of said first control transistor in circuit with the base electrode of said transistor switch, said circuit means connecting the emitter electrode of said first control transistor in circuit with the bias supply means so that when said first control transistor is switched on the base electrode of said transistor switch is positive with respect to its emitter electrode, means coupling the collector electrode of said second control transistor in circuit with the base electrode of said first control transistor so that when said second control transistor conducts the base electrode of said first control transistor is negative with respect to its emitter and is switched to a low impedance state, and a feedback means supplying a feedback signal to said tunnel diode to activate said tunnel diode to a low voltage state and to a high voltage state in order to thereby control the switching action of said PNP transistor switch.

References Cited in the file of this patent
UNITED STATES PATENTS
3,051,852     Mintz et al. _____ Aug. 28, 1962

OTHER REFERENCES

G. E. Tunnel Diode Manual, pages 44–45, Mar. 20, 1961.